US012799897B2

(12) United States Patent
Ackermann

(10) Patent No.: US 12,799,897 B2
(45) Date of Patent: Nov. 17, 2026

(54) SCOOP FED HEAT EXCHANGE FOR AN OPEN ROTOR GAS TURBINE ENGINE

(71) Applicant: RTX Corporation, Farmington, CT (US)

(72) Inventor: William K. Ackermann, East Hartford, CT (US)

(73) Assignee: RTX Corporation, Farmington, CT (US)

( * ) Notice: Subject to any disclaimer, the term of this patent is extended or adjusted under 35 U.S.C. 154(b) by 84 days.

(21) Appl. No.: 18/680,275

(22) Filed: May 31, 2024

(65) Prior Publication Data

US 2025/0369394 A1 Dec. 4, 2025

(51) Int. Cl.

| | |
|---|---|
| ***F02C 7/18*** | (2006.01) |
| ***B64D 33/10*** | (2006.01) |
| ***F02C 7/14*** | (2006.01) |
| *F01D 25/12* | (2006.01) |

(52) U.S. Cl.

CPC ................ *F02C 7/18* (2013.01); *B64D 33/10* (2013.01); *F02C 7/14* (2013.01); *F01D 25/12* (2013.01); *F01D 25/125* (2013.01); *F05D 2260/213* (2013.01)

(58) Field of Classification Search

CPC ... F02C 7/18; F02C 7/14; B64D 33/10; F01D 25/12; F01D 25/125; F05D 2260/213

See application file for complete search history.

(56) References Cited

U.S. PATENT DOCUMENTS

| | | | | |
|---|---|---|---|---|
| 5,123,242 A | | 6/1992 | Miller | |
| 10,385,777 B2 | | 8/2019 | Jen et al. | |
| 11,384,649 B1 | | 7/2022 | Rambo | |
| 2007/0245739 A1* | | 10/2007 | Stretton | F02C 7/185 60/728 |
| 2012/0272658 A1* | | 11/2012 | Murphy | F02C 7/185 165/96 |
| 2015/0275759 A1* | | 10/2015 | Teia Dos Santos Mendes Gomes | F02C 7/057 29/889.22 |
| 2017/0044984 A1* | | 2/2017 | Pesyna | F02K 3/115 |

(Continued)

FOREIGN PATENT DOCUMENTS

| | | |
|---|---|---|
| CN | 114922732 A | 8/2022 |
| EP | 1795708 B1 | 2/2014 |

OTHER PUBLICATIONS

Partial European Search Report for EP Application No. 25179713.0 dated Nov. 14, 2025.

*Primary Examiner* — Gerald L Sung
*Assistant Examiner* — Rene D Ford
(74) *Attorney, Agent, or Firm* — Carlson, Gaskey & Olds, P.C.

(57) ABSTRACT

A gas turbine engine includes an open rotor propulsor for delivering air into a core engine inward of an outer core panel. The core engine has a compressor section, a combustor and a turbine section. An exit guide vane extends radially outward of the outer core panel. The exit guide vane has a pressure side and a suction side defined between a leading edge and a trailing edge. The exit guide vane includes at least one air scoop configured to capture the air from the open rotor propulsor and direct the captured air into the exit guide vane. A heat exchanger is positioned in the outer core pane. The captured air is passed over the heat exchanger and is configured to cool another fluid.

20 Claims, 3 Drawing Sheets

(56) References Cited

U.S. PATENT DOCUMENTS

| | | | | |
|---|---|---|---|---|
| 2019/0323433 | A1* | 10/2019 | Bewick | F02C 3/06 |
| 2022/0403780 | A1* | 12/2022 | Price | F02C 7/14 |
| 2024/0200495 | A1* | 6/2024 | Hussain | F02C 7/18 |
| 2025/0084769 | A1* | 3/2025 | Smith | F01D 9/065 |

* cited by examiner

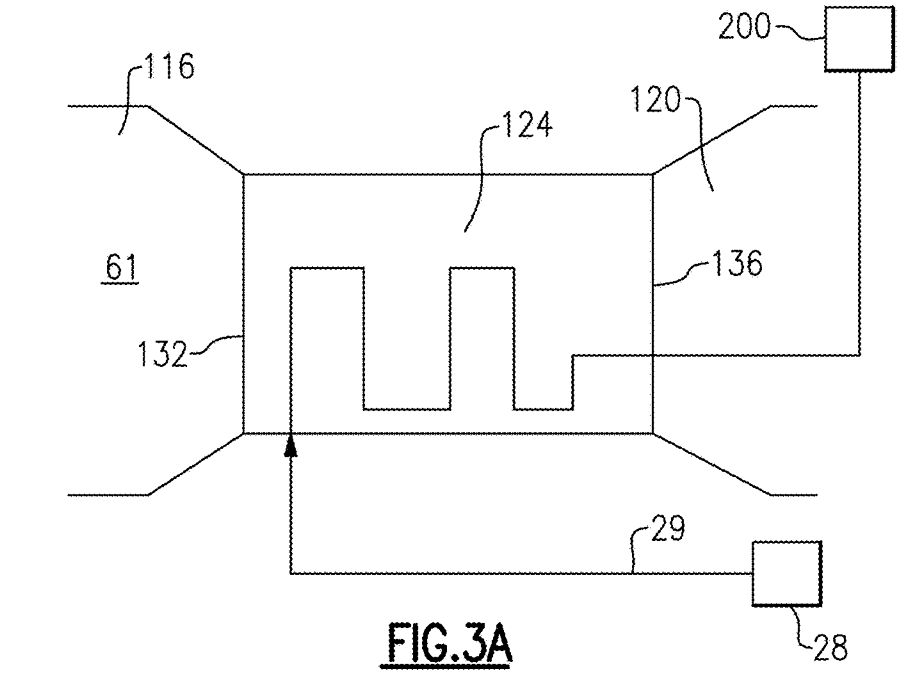
FIG.3A
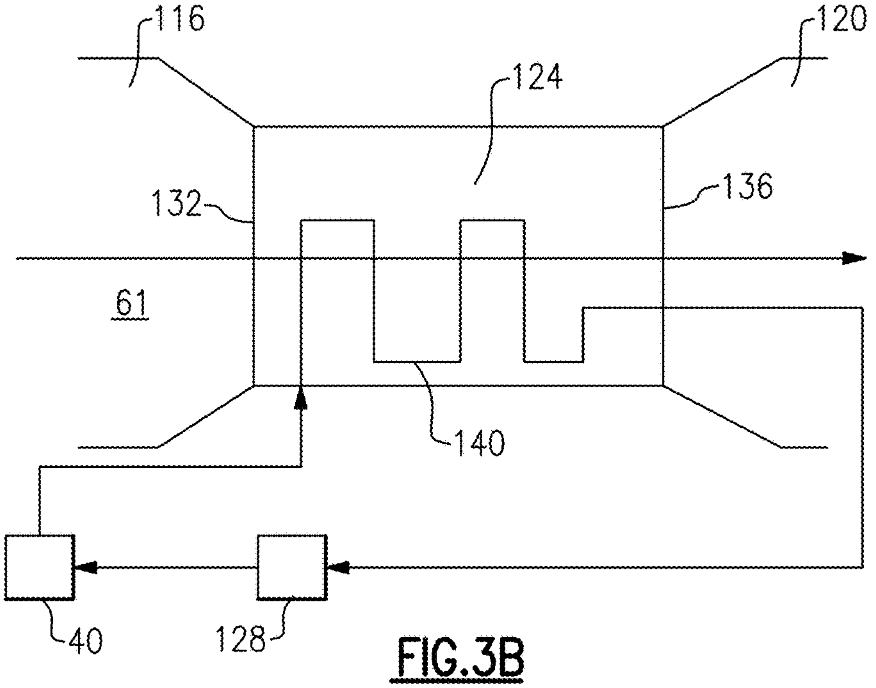
FIG.3B
FIG.4
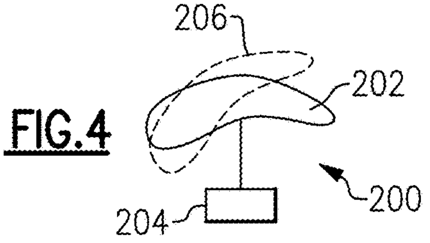

SCOOP FED HEAT EXCHANGE FOR AN OPEN ROTOR GAS TURBINE ENGINE

BACKGROUND

This application relates to open rotor (e.g., propfan) gas turbine engines, and more particularly, propfan gas turbine engines including an exit guide vane.

Gas turbines engines are known and typically have a fan delivering air into a bypass duct as propulsion air and into a core engine. The bypass duct is defined between a fan case and a core engine case. The core engine includes a compressor which compresses the air and delivers it into a combustor. The compressed air is mixed with fuel and ignited and products of that combustion pass downstream over turbine rotors driving them to rotate. The turbine rotors in turn drive compressor and fan rotors.

A heat exchanger may be positioned in the bypass duct. For example, a heat exchanger could be mounted on the core engine case. The fan bypass air thus cools an engine fluid in the heat exchanger.

The operation of heat exchangers in propfan gas turbines engines can be challenging. Propfan gas turbine engines are known and typically include an open rotor propulsor or propeller. However, propfan gas turbine engines do not have a fan case or bypass duct and typically have a lower propulsor (or fan) pressure ratio (FPR) than ducted gas turbine engines. If a heat exchanger were mounted on the core engine housing, the lack of a fan case and bypass duct would make the heat exchanger more prone to damage from contaminants and contact by foreign objects. Accordingly, a heat exchanger must be cooled from another source.

Attempting to scoop air directly into the core engine housing may be challenging. As an example, there is limited dynamic pressure at the outer surface of the core housing to drive cooling air over a heat exchanger because of the reduced FPR.

SUMMARY

In a featured embodiment, a gas turbine engine includes an open rotor propulsor for delivering air into a core engine inward of an outer core panel. The core engine has a compressor section, a combustor and a turbine section. An exit guide vane extends radially outward of the outer core panel. The exit guide vane has a pressure side and a suction side defined between a leading edge and a trailing edge. The exit guide vane includes at least one air scoop configured to capture the air from the open rotor propulsor and direct the captured air into the exit guide vane. A heat exchanger is positioned in the outer core pane. The captured air is passed over the heat exchanger and is configured to cool another fluid.

In another embodiment according to the previous embodiment, the at least one air scoop is located on the pressure side of the exit guide vane.

In another embodiment according to any of the previous embodiments, the at least one air scoop is located proximate the stagnation line of the exit guide vane.

In another embodiment according to any of the previous embodiments, the outer core panel defines a chamber along with an inner core panel and is configured to receive the captured air. The heat exchanger is housed within the chamber.

In another embodiment according to any of the previous embodiments, the chamber includes a first section configured to deliver the captured air across the heat exchanger and a second section configured to exhaust the captured air out of a downstream end of the outer core panel.

In another embodiment according to any of the previous embodiments, the downstream end of the outer core panel is aft of the exit guide vane.

In another embodiment according to any of the previous embodiments, the other fluid includes an air bled from the engine and cooled for a use in an associated aircraft or its propulsion system.

In another embodiment according to any of the previous embodiments, the use is at least one of an environmental control system or a compartment buffer air system.

In another embodiment according to any of the previous embodiments, the other fluid is oil.

In another embodiment according to any of the previous embodiments, the oil lubricates a bearing in the propfan gas turbine engine.

In another embodiment according to any of the previous embodiments, the oil lubricates a geared architecture in the propfan gas turbine engine.

In another embodiment according to any of the previous embodiments, the at least one air scoop includes a plurality of air scoops spaced equidistant from one another along the exit guide vane.

In another embodiment according to any of the previous embodiments, the at least one air scoop includes at least one of a circular, ovular, or semi-circular shape.

In another embodiment according to any of the previous embodiments, the at least one air scoop includes at slot that runs in the radial direction along or proximate to the stagnation line of the exit guide vane.

In another embodiment according to any of the previous embodiments, the exit guide vane is adjustable such that an orientation of an airfoil may be changed by an actuator.

In another featured embodiment, a gas turbine includes an open rotor propulsor for delivering air into a core engine inward of an outer core panel. The core engine has a compressor section, a combustor and a turbine section. An exit guide vane extends radially outward of the outer core panel. The exit guide vane has a pressure side and a suction side defined between a leading edge and a trailing edge. The exit guide vane includes at least one air scoop configured to capture air and direct the captured air into the exit guide vane. A heat exchanger is positioned in the outer core panel. The captured air is passed over the heat exchanger and is configured to cool another fluid. The outer core panel defines a chamber along with an inner core panel and configured to receive the captured air. The heat exchanger is housed within the chamber. The chamber includes a first section configured to deliver the captured air across the heat exchanger and a second section configured to exhaust the captured air aft of the exit guide vane.

In another embodiment according to any of the previous embodiments, the at least one air scoop is located on the pressure side of the exit guide vane.

In another embodiment according to any of the previous embodiments, the at least one air scoop is located proximate the stagnation line of the exit guide vane.

In another embodiment according to any of the previous embodiments, the downstream end of the outer core panel is aft of the exit guide vane.

In another embodiment according to any of the previous embodiments, the exit guide vane is adjustable such that an orientation of an airfoil may be changed by an actuator.

The present disclosure may include any one or more of the individual features disclosed above and/or below alone or in any combination thereof.

These and other features of the present invention can be best understood from the following specification and drawings, the following of which is a brief description.

BRIEF DESCRIPTION OF THE DRAWINGS

FIG. 3A is a view of an example heat exchanger system for the propfan gas turbine engine of FIG. 1.

FIG. 3B shows another example heat exchanger system for the propfan gas turbine engine of FIG. 1.

FIG. 4 shows a variable fan exit guide vane.

DETAILED DESCRIPTION

Figure 1:
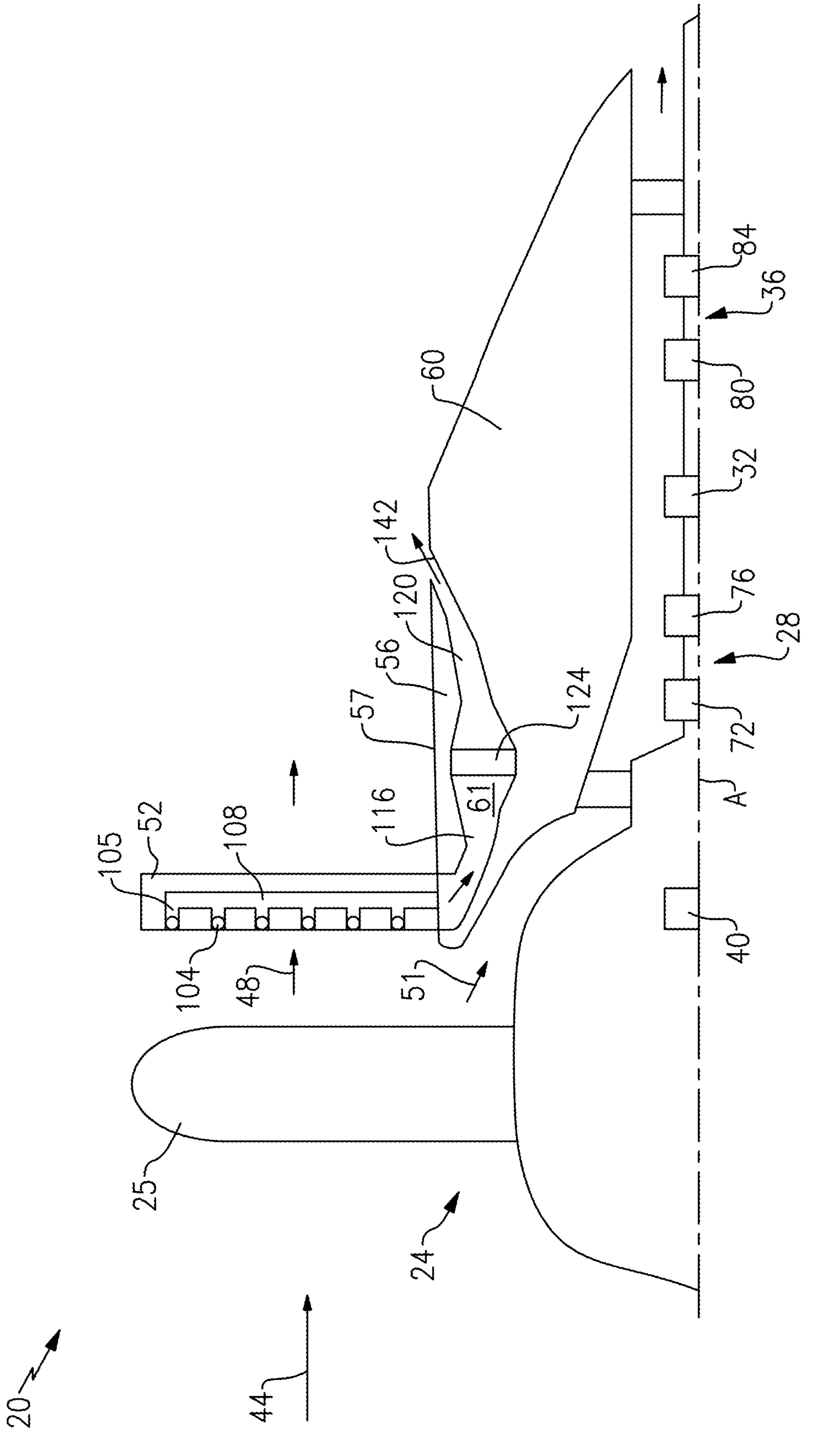
FIG. 1 illustrates selected portions of an example propfan gas turbine engine.

FIG. 1 schematically illustrates selected portions of an open rotor, or propfan, gas turbine engine 20 about an engine central longitudinal axis A. The propfan gas turbine engine 20 is disclosed herein as a turbine engine that generally incorporates an open rotor propulsor or propeller 24, a compressor section 28, a combustor 32 and a turbine section 36, all show schematically.

Notably, as would be appreciated by a person of ordinary skill in the art having the benefit of this disclosure, a propfan gas turbine engine does not include a fan case or a bypass duct.

An open rotor propulsor is defined for purposes of this application as a propulsor typically known as a propeller that has no housing radially outward of a plurality of blades 25. The count and geometry of the plurality of blades may be more like a propellor of a turboprop propulsion system, a fan blade of a ducted turbofan propulsion system or a hybrid of both. The use of such a design allows the blade 25 outer diameter to increase significantly, with an associated reduction in propulsor pressure ratio across the blades 25.

The propeller 24 may be connected to a geared architecture 40 to drive the propeller 24 at a lower speed than a speed of a drive turbine, as described below. The geared architecture 40 may be an epicyclic gear train made up of one or more gear systems, such as a planetary gear system, a star gear system, or the like.

The propeller 24 may drive ambient air 44 in a downstream direction along a propulsion flow path 48 and along a core flow path 51. Airflow exiting the propeller 24 along the propulsion flow path 48 may flow across an exit guide vane 52 to generate propulsion thrust. Exit guide vane 52 has an airfoil shape to direct the air moving downstream, such as to straighten or de-swirl the airflow flowing from the propeller 24 to increase propulsive thrust.

Airflow exiting the propeller 24 along the core flow path 51 flows into a core engine inward of an outer core panel 56 and an inner core panel 60. The outer core panel 56 has an outer wall 57. The outer panel 56 encloses a portion of the engine core, and also encloses a portion of the inner core panel 60. The inner core panel 60 is radially inward the outer core panel 56 and encloses a portion of the engine core. A chamber 61 is defined between the outer core panel 56 and the inner core panel 60.

The inner core panel 60 guides the air from the propeller 24 along the core flow path 51 for compression and communication into the combustor 32 then expansion through the turbine section 36.

Airflow in the core flow path 51 is compressed in compressor section 28 by at least a low pressure compressor 72 (LPC 72) and a high pressure compressor 76 (HPC 76). Though illustrated as a two stage compressor, with an LPC 72 and HPC 76, this is not intended to be so limiting, and the compressor section 28 may additionally include an intermediate compressor section between the LPC 72 and the HPC 76. Air from the compressor section is delivered into the combustor 32. In the combustor 32, the air is mixed with fuel and ignited.

Products of the combustion pass downstream and to the turbine section 36, where the air is expanded across a high pressure turbine 80 and a low pressure turbine 84.

The operation of the engine sections 24, 28, 32 and 36 may be generally as known. It should be understood that the concepts described herein may be applied to other types of turbine engines including three-spool architectures or turbine engines where the turbine section 36 resides between the propeller 24 and the combustor 32.

As will be appreciated, the ambient air 44 exits the propeller 24 along the propulsion flow path 48 and the core flow path 51 at low temperatures (e.g., between about −65 degrees F. and 60 degrees F.). This now dynamic air can be useful for cooling internal components of the core engine. However, due to the lack of a fan case and a bypass duct and the corresponding reduced propulsor pressure ratio, resulting in limited bulk static pressure, positioning a heat exchanger in the propulsion flow path 48 can be challenging. For instance, a heat exchanger placed on the outer core panel 56 wall 57 would be exposed to contaminants and contact by foreign objects. As discussed below, the exit guide vane 52 and the inner and outer core panels 56 and 60 may be configured to deliver some of the propulsion air 48 to an internal heat exchanger in chamber 61, to cool internal components of the core engine.

The exit guide vane 52 extends radially outward from a side of the outer core panel 56. Although the engine 20 is depicted as including one exit guide vane 52, it should be understood that the engine 20 includes a plurality of radially extending exit guide vanes 52 that are circumferentially spaced apart relative to the outer core panel 56.

Figure 2:
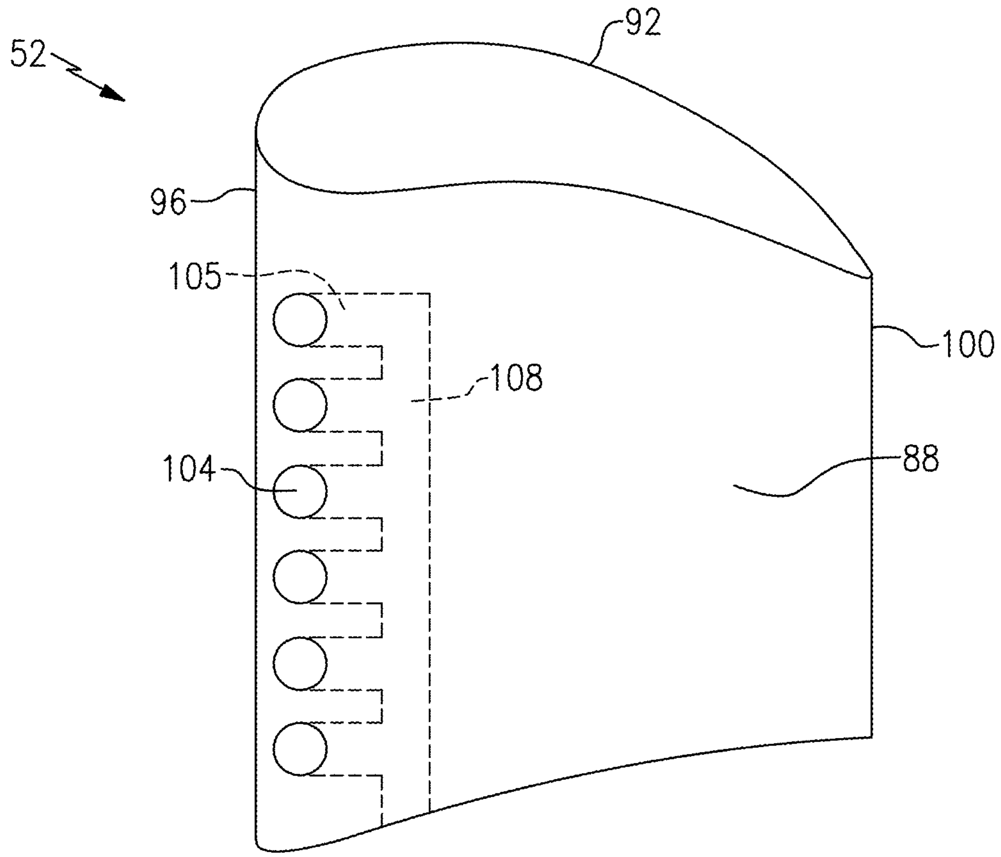
FIG. 2 is a view of an example exit guide vane of the propfan gas turbine engine of FIG. 1.

Referring to FIG. 2, with continued reference to FIG. 1, the exit guide vane 52 has an airfoil shape and includes a pressure side 88 and a suction side 92 that extend between a leading edge 96 and a trailing edge 100.

The leading edge 96 portion of the exit guide vane 52 includes a plurality of air scoops 104 for capturing air exiting the propeller 24 along the propulsion flow path 48. As shown, the plurality of air scoops 104 are on the suction side 92, near the stagnation line, closer to the leading edge 96 than the trailing edge 100. Though depicted on the suction side 92, the air scoops 104 may additionally or alternatively be located on the pressure side 88 of the exit guide vane 52. Additionally, though depicted as having a substantially circular inlet, this is not intended to be so limiting and other shapes and configurations of air scoops 104 are contemplated herein. For example, the air scoops 104 may include an ovular, a semi-circle, rectangular, or other shape inlet.

In the illustrative example of FIG. 1, the air scoops 104 are radially spaced apart and project inward from the leading edge 96 to form an inlet for delivering air into the exit guide vane 52. Though depicted as spaced equidistant from one another, this is not intended to be so limiting, and the inlets may be spaced at different distances from a root of the exit guide vane 52 (e.g., proximate outer core panel 56 at wall 57) to a tip (e.g., distal end) of the exit guide vane 52. Additionally, though depicted in FIG. 1 as including six (6) air scoops 104, this is not intended to be so limiting and an exit guide vane 52 as described herein may include a greater or lesser number of air scoops 104. The relative density of air scoops 104, e.g. quantity or inlet area of air scoops 104 may vary from a root of the exit guide vane 52 (e.g., proximate outer core panel 56 at wall 57) to a tip (e.g., distal end) of the exit guide vane 52.

As will be appreciated, air exits the propeller 24 along the propulsion flow path 48 at high speeds. Air enters the air scoops 104, and associated passages 105 that communicate with a passage 108. Passage 108 leads to chamber 61 (FIG. 1), where the air from the various exit guide vane scoops is collected.

Returning to FIG. 1, the outer core panel 56 includes chamber 61 having a first section 116 and a second section 120 that each connect to a respective end of a heat exchanger 124 therebetween. In one example, the chamber 61 is annular.

The heat exchanger 124 is configured to transfer heat between fluids that flow through the heat exchanger 124.

FIG. 3A shows details of one heat exchanger assembly. Here, air is tapped at 29 from a compressor section 28 of the associated engine. That air passes through the heat exchanger 124. Air in the chamber 61 passes over the heat exchanger 124 to cool the air from compressor section 28. The air may then be sent to a use 200. In embodiments the use may be an environmental control system for an associated aircraft. Alternatively, the air may be used for a compartment buffer air system. Other uses of cooled air may also be utilized.

In an embodiment shown in FIG. 3B a lubricant, such as oil, from a lubrication system 128 is delivered to the geared architecture 40, such as to lubricate bearings therein. As the lubricant flows through the geared architecture 40 and/or other bearing compartments, the temperature of the lubricant increases. After the geared architecture 40 and/or other bearings or bearing compartments (not depicted), the lubricant is routed through the heat exchanger 124. In the heat exchanger 124, the lubricant flows from an inlet side 132 of the heat exchanger 124 to an outlet side 136 of the heat exchanger 124 along a lubricant line 140. As depicted and described, the heat exchanger 124 is a parallel flow heat exchanger however heat exchanger 124 could alternatively be configured as a counter flow heat exchanger.

In both systems the first section 116 of the chamber 61 communicates air from the passage 108 across the heat exchanger 124. The captured air then flows over the heat exchanger 124 from the inlet side 132 to the outlet side 136. The temperature of the air in passage 29 and lubricant in lubricant line 140 is reduced by the lower temperature ambient air flowing over the heat exchanger 124, and then the air is sent to use 200 (FIG. 3A) or lubricant is reintroduced into the lubrication system 128 (FIG. 3B).

At the same time, the temperature of the ambient air flowing over the heat exchanger 124 is increased prior to flowing into the second section 120 and subsequently being exhausted.

In these examples, the heated air in the second section 120 is exhausted downstream (e.g., at a location aft) of the exit guide vane 52, as indicated by arrow 142 in FIG. 1. The heated air is then combined with the fanstream air flowing along the propulsion flow path 48. In one example, the heated air is exhausted through an orifice in the outer core panel 56. With the heated air dumped downstream of the exit guide vane 52, the static pressure will be close to ambient pressure due to the open rotor configuration.

An overall system pressure delta across the system is as follows:

$HEX_{sys}\ \Delta P=(P_{amb}+P_{bld\text{-}dyn})-(P_{amb})=P_{bld\text{-}dyn}$ where $P_{amb}$ is the pressure of the ambient air 44, $P_{bld\text{-}dyn}$ is the dynamic portion of the pressure downstream of the propeller 24. This illustrates that capturing air through air scoops 104 allows the $HEX_{sys}$ to be designed for a delta P equivalent to the expected dynamic portion of the pressure downstream of the propeller 24.

FIG. 4 schematically shows a fan exit guide vane 200 which is adjustable. As shown, the relative orientation of an airfoil 202 may be changed by an actuator 204, as known, to a distinct position 206. The reason why orientation is changed, and the way that such a system works, are known in the art. However, when utilized in combination with the air scoops as disclosed above, the embodiment is unique.

With such a system there are several advantages. First, the cooling air for the heat exchanger is input via existing systems in the open rotor configuration, and thus does not require additional or alternative systems (e.g., refrigerant pump, reservoir, etc.) or additional flow paths or streams through the engine. The air passing across the heat exchanger is close to ambient temperature since the air passes only through the propeller. In certain operating conditions, it may become necessary to provide anti-ice to the fan exit guide vane. Having the air entering the air scoops may provide some additional heat to at least partially address this challenge.

Example heat exchangers can include plate-fin, tube-shell, laminated-layer or other suitable types of heat exchangers depending on the pressure and temperature requirements. As understood, each of these would include passages of some sort receiving a fluid to be cooled, and including open space for the cooling air to pass over the passages.

A gas turbine engine under this disclosure could be said to include an open rotor propulsor for delivering air into a core engine inward of an outer core panel. The core engine has a compressor section, a combustor and a turbine section. An exit guide vane extends radially outward of the outer core panel. The exit guide vane has a pressure side and a suction side defined between a leading edge and a trailing edge. The exit guide vane includes at least one air scoop configured to capture the air from the open rotor propulsor and direct the captured air into the exit guide vane. A heat exchanger is positioned in the outer core panel. The captured air passes over the heat exchanger and is configured to cool another fluid.

A gas turbine engine under this disclosure could also be said to include an open rotor propulsor for delivering air into a core engine inward of an outer core panel. The core engine has a compressor section, a combustor and a turbine section. An exit guide vane extends radially outward of the outer core panel. The exit guide vane has a pressure side and a suction side defined between a leading edge and a trailing edge. The exit guide vane includes at least one air scoop configured to capture air and direct the captured air into the exit guide vane. A heat exchanger is positioned in the outer core panel. The captured air passes over the heat exchanger and is configured to cool another fluid. The outer core panel defines a chamber along with an inner core panel and is configured to receive the captured air. The heat exchanger is housed within the chamber. The chamber includes a first section configured to deliver the captured air across the heat exchanger and a second section configured to exhaust the captured air out of a downstream end of the outer core panel.

Although embodiments have been disclosed, a worker of ordinary skill in this art would recognize that modifications would come within the scope of this disclosure. For that reason, the following claims should be studied to determine the true scope and content of this disclosure.

What is claimed is:

1. A gas turbine engine comprising:

an open rotor propulsor for delivering air into a core engine inward of an outer core panel, the core engine having a compressor section, a combustor and a turbine section;

an exit guide vane extending radially outward of the outer core panel, the exit guide vane having a pressure side and a suction side defined between a leading edge and a trailing edge, the exit guide vane including at least one air scoop configured to capture the air from the open rotor propulsor and direct the captured air into the exit guide vane; and a heat exchanger positioned in the outer core panel, the captured air passing over the heat exchanger and configured to cool another fluid.

2. The gas turbine engine as recited in claim 1, wherein the at least one air scoop is located on the pressure side of the exit guide vane.

3. The gas turbine engine as recited in claim 1, wherein the at least one air scoop is located proximate the stagnation line of the exit guide vane.

4. The gas turbine engine as recited in claim 1, wherein the outer core panel defines a chamber along with an inner core panel and configured to receive the captured air, wherein the heat exchanger is housed within the chamber.

5. The gas turbine engine as recited in claim 4, wherein the chamber comprises a first section configured to deliver the captured air across the heat exchanger and a second section configured to exhaust the captured air out of a downstream end of the outer core panel.

6. The gas turbine engine as recited in claim 5, wherein the downstream end of the outer core panel is aft of the exit guide vane.

7. The gas turbine engine as recited in claim 1, wherein the other fluid comprises an air bled from the engine and cooled for used in an associated aircraft or aircraft propulsion system.

8. The gas turbine engine as recited in claim 7, wherein the use is at least one of an environmental control system or a compartment buffer air system.

9. The gas turbine engine as recited in claim 1, wherein the other fluid is oil.

10. The gas turbine engine as recited in claim 9, wherein the oil lubricates a bearing in the propfan gas turbine engine.

11. The gas turbine engine as recited in claim 9, wherein the oil lubricates a geared architecture in the propfan gas turbine engine.

12. The gas turbine engine as recited in claim 1, wherein the at least one air scoop comprises a plurality of air scoops spaced equidistant from one another along the exit guide vane.

13. The gas turbine engine as recited in claim 1, wherein the at least one air scoop comprises at least one of a circular, ovular, or semi-circular shape.

14. The gas turbine engine as recited in claim 1, wherein the at least one air scoop comprises a slot that runs in the radial direction along or proximate to the stagnation line of the exit guide vane.

15. The gas turbine engine as recited in claim 1, wherein the exit guide vane is adjustable such that an orientation of an airfoil may be changed by an actuator.

16. The gas turbine engine as recited in claim 15, wherein the at least one air scoop is located on the pressure side of the exit guide vane.

17. The gas turbine engine as recited in claim 15, wherein the at least one air scoop is located proximate the stagnation line of the exit guide vane.

18. The gas turbine engine as recited in claim 15, wherein the downstream end of the outer core panel is aft of the exit guide vane.

19. A gas turbine comprising:

an open rotor propulsor for delivering air into a core engine inward of an outer core panel, the core engine having a compressor section, a combustor and a turbine section;

an exit guide vane extending radially outward of the outer core panel, the exit guide vane having a pressure side and a suction side defined between a leading edge and a trailing edge, the exit guide vane including at least one air scoop configured to capture air and direct the captured air into the exit guide vane;

a heat exchanger positioned in the outer core panel, the captured air passing over the heat exchanger and configured to cool another fluid;

wherein the outer core panel defines a chamber along with an inner core panel and configured to receive the captured air, wherein the heat exchanger is housed within the chamber; and wherein the chamber comprises a first section configured to deliver the captured air across the heat exchanger and a second section configured to exhaust the captured air aft of the exit guide vane.

20. The gas turbine engine as recited in claim 19, wherein the exit guide vane is adjustable such that an orientation of an airfoil may be changed by an actuator.

* * * * *